May 15, 1962 L. MAIER 3,034,426
ACCOUNTING MACHINE WITH PUNCH AND PRINTER FOR CARDS
Filed April 28, 1958 7 Sheets-Sheet 1

FIG. 1a.

INVENTOR
Lorenz Maier
by:
Michael S. Striker
Attorney

May 15, 1962 L. MAIER 3,034,426
ACCOUNTING MACHINE WITH PUNCH AND PRINTER FOR CARDS
Filed April 28, 1958 7 Sheets-Sheet 5

FIG. 5

INVENTOR
Lorenz Maier
BY
Michael S. Striker
Attorney

May 15, 1962 L. MAIER 3,034,426
ACCOUNTING MACHINE WITH PUNCH AND PRINTER FOR CARDS
Filed April 28, 1958 7 Sheets-Sheet 6

Lorenz Maier
INVENTOR
BY Michael S. Striker
Attorney

May 15, 1962 L. MAIER 3,034,426
ACCOUNTING MACHINE WITH PUNCH AND PRINTER FOR CARDS
Filed April 28, 1958 7 Sheets-Sheet 7

FIG. 8

INVENTOR
Lorenz Maier
BY Michael S. Striker
Attorney

United States Patent Office 3,034,426
Patented May 15, 1962

3,034,426
ACCOUNTING MACHINE WITH PUNCH AND PRINTER FOR CARDS
Lorenz Maier, Villingen, Black Forest, Germany, assignor to Kienzle Apparate G.m.b.H., Villingen, Black Forest, Germany
Filed Apr. 28, 1958, Ser. No. 731,194
Claims priority, application Germany Sept. 13, 1957
21 Claims. (Cl. 101—19)

The present invention relates to an accounting machine with a punch and a printer for cards, and more particularly to an accounting machine of the type in which a paper carriage is provided for supporting an account sheet on which all entries are printed or typed.

It is one object of the present invention to provide in the accounting machine additional printing means which automatically print on a record card the entries which are simultaneously printed on the account sheet.

It is another object of the present invention to provide an accounting machine in which a card is automatically punched with holes representing entries which are simultaneously printed on the account sheet. It is another object of the present invention to provide an accounting machine in which a record card is simultaneously punched and provided with imprints corresponding to numerical values, or other data, simultaneously entered into the accounting machine, computed in the accounting machine, or printed on an account card on the paper carriage of the accounting machine.

It is consequently also an object of the present invention to produce record cards carrying a record of operations of the accounting machine in the form of punched holes and legible imprints.

Another object of the present invention is to provide means controlling the transport of the record cards in such a manner that holes are punched into the cards in column positions associated with selected columns of an account sheet located on the paper carriage of the machine. Another object of the present invention is to automatically punch and print each record card when the paper carriage of the accounting machine arrives in selected positions.

A further object of the present invention is to prevent punching of holes into the record card in index positions associated with denominational orders in which no entry was made in the accounting machine.

A further object of the present invention is to print on the record card only imprints associated with denominational orders in which an entry has been made in the accounting machine.

With these objects in view, the present invention mainly consists in an apparatus for marking record cards under the control of elements of the accounting machine. One embodiment of the apparatus of the present invention comprises transporting means for transporting a card into a marking position; punching means including punches respectively associated with a series of characters, or digits, each punch being movable to a punching position for punching the card; printing means movable between a plurality of preset positions respectively associated with the characters or digits, and being movable to a printing position for printing on the card the characters or digits associated with the respective preset position of the printing means; control means movable to an actuated position and being shiftable between a plurality of shifted positions associated with said characters or digits; and operating means for actuating the control means to move to the actuated position. The control means is located opposite a different punch in each shifted position, and engages the same in actuated position. The control means is further connected to the printing means to move the same between the preset positions thereof when the control means moves between the shifted positions. Consequently when the control means is moved by the operating means to the actuated position thereof, selected punches are moved to punching position, and the printing means are moved to printing position whereby holes are punched in the card representing characters or digits selected by shifting the control means, while the same selected characters are printed on the card by the printing means.

The control means is connected to a corresponding element of the accounting machine which is shifted between corresponding shifted positions when a character or digit is introduced and printed in the accounting machine, or computed and printed in the accounting machine. Such printing in the accounting machine is carried out on an account sheet located on a movable paper carriage.

Consequently, the present invention also consists in means for punching and printing a record card in accordance with characters or digits entered or computed in the accounting machine.

In the preferred embodiment of the present invention, the control means include a set of control bars which are respectively associated with denominational orders, such as decimal orders and are longitudinally shiftable between a plurality of shifted positions which are respectively associated with the digits of the respective order. The control bars have rack bar portions which mesh with gear means by which a set of turnable printing means are driven which are capable of printing on the record card the digits of the orders with which they are associated. The punching means include a set of rows of punches, each row being associated with a denominational order, and including a punch for each digit. The control bars move along associated rows and have coupling members which in each shifted position of the control bars, is located opposite a selected punch for punching the respective digit when the operating means are moved to actuated position engaging the coupling members.

In accordance with the present invention, a slide member is provided on the operating means which can be set in such a manner that the operating means actuate only a selected number of coupling members on control bars, whereas the higher orders of the respective number are not punched. This permits the punching of a different number of orders in each column of the record card. The slide member is controlled by a cam which turns in timed relation with the transporting means so that in each marking position of the record card, a selected number of orders is punched in the respective column of the record card. Perforations representing zero may also be punched in the higher orders of the record card.

In accordance with the present invention, a transport control means is connected to the transporting rollers for turning movement and is stopped under the control of tabs on the paper carriage of the machine so that the card is stopped in a selected position with respect to the punching means and the printing means when the paper carriage arrives at a predetermined position.

Similar tabs on the paper carriage effect coupling of the drive means of the machine to the operating means at a selected moment of the operational cycle so that the record card is punched, and printed, after the punching means and printing means were set to proper printing position by the shifting of the control bars under the control of corresponding associated elements in the business machine which by their position represent the digits of a multi-order number. The transport control means preferably includes a plurality of stop members which can be set to differently displaced positions corresponding to the spacing the columns.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGURE 1 includes the partial FIGURES 1a and 1b and is a longitudinal sectional view illustrating a known accounting machine provided with the apparatus of the present invention;

Figure 1A:
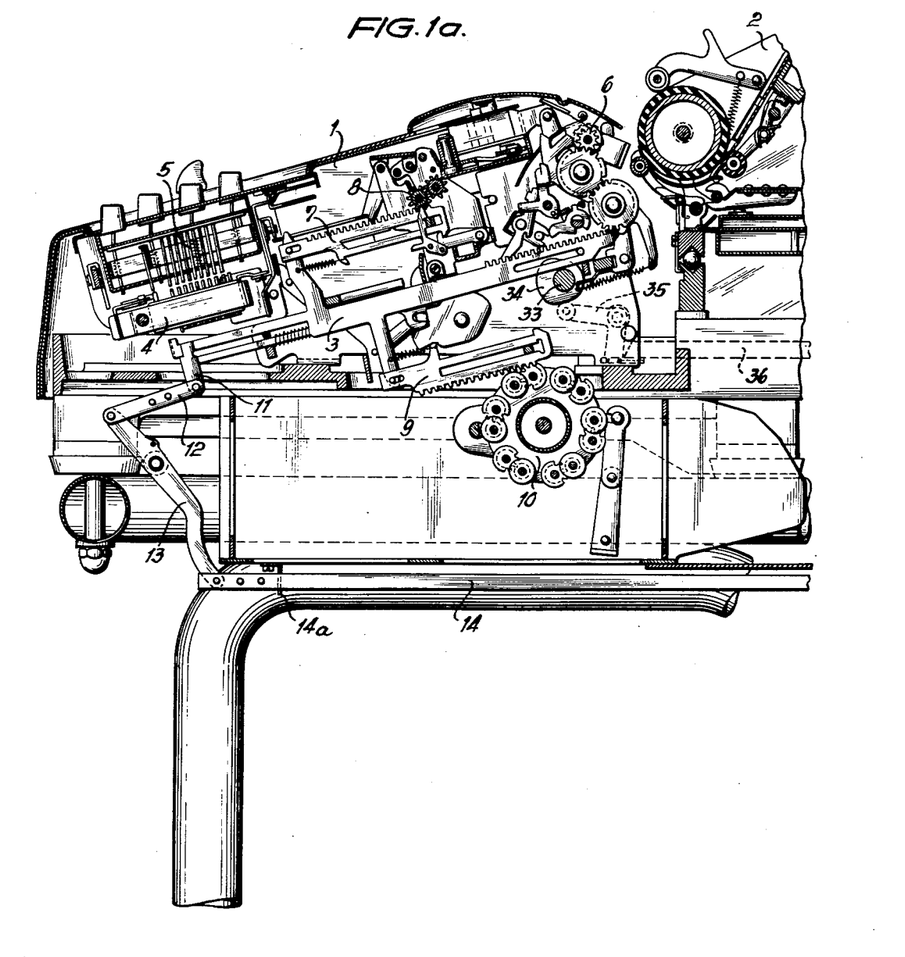
Figure 1B:
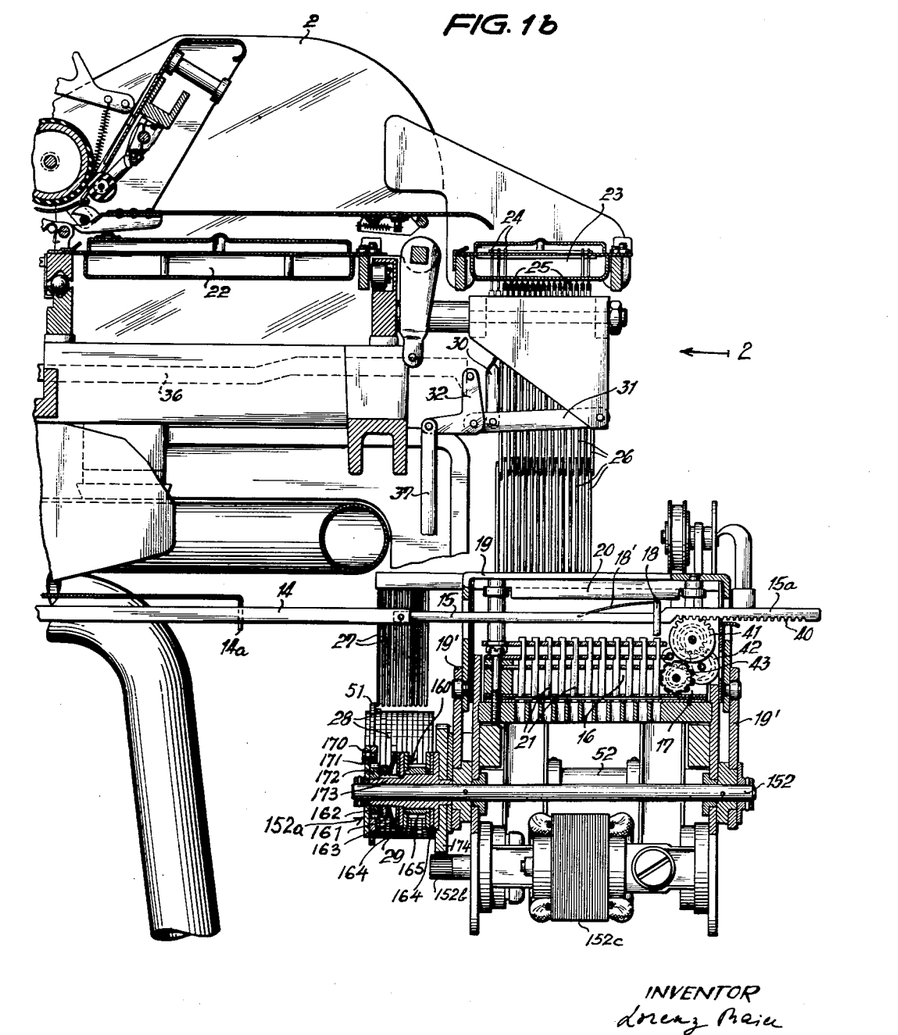
Figure 2:
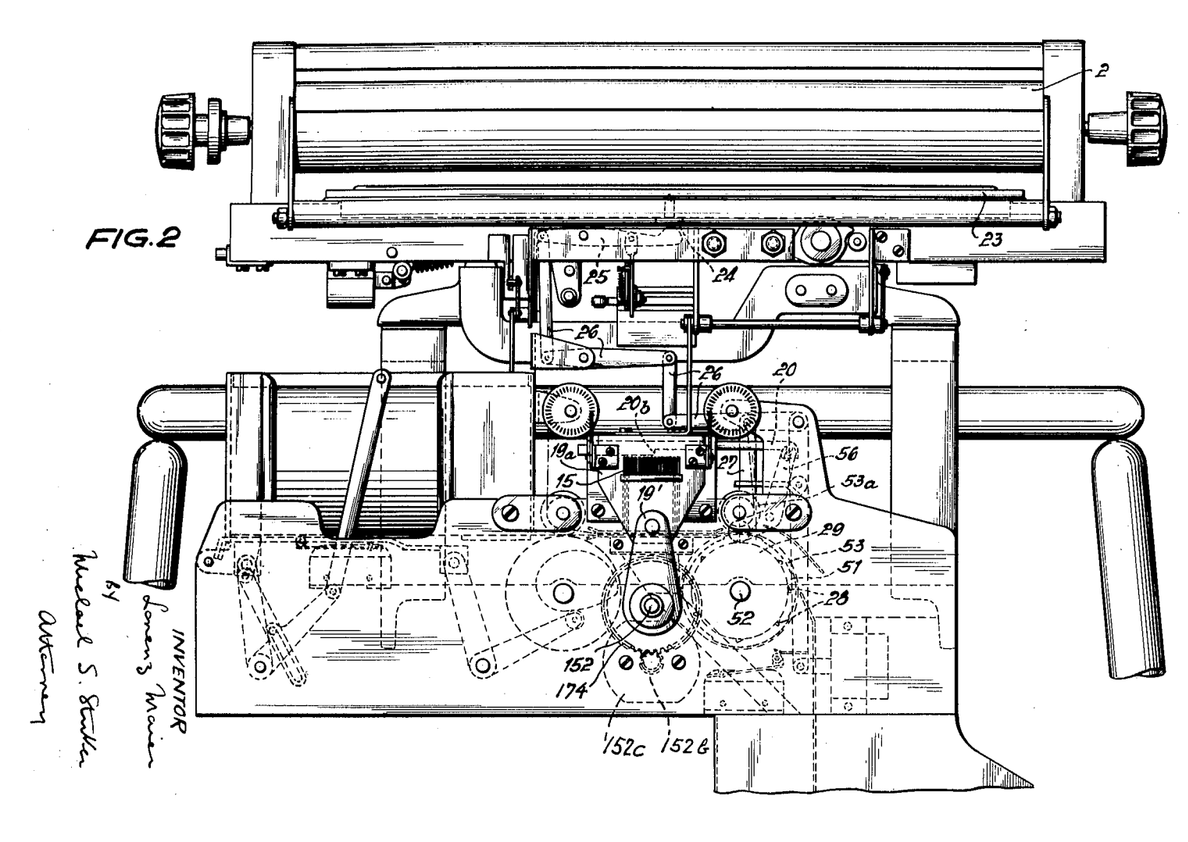
FIGURE 2 is a rear view of the machine taken in direction of arrow 2 in FIGURE 1.

Referring now to the drawings, and more particularly to FIGURES 1 and 2 an accounting machine 1 has a paper carriage 2 for supporting an account sheet on which entries are printed by printing means 6 in different column positions which are determined by movement and stopping of the paper carriage 2. A keyboard 5 is provided for entering values into the pin carriage 4. Differential slide elements 3 sense the positions of the pins of the pin carriage, so that the position of each differential slide element 3 represents a digit in the decimal order with which the respective slide element 3 is associated. Slide elements 3 have rack portions meshing with gear means through which the printing means 6 in the respective order is set to corresponding position for printing the respective digit. Another set of rack bars 7 is connected to the slide element 3, and meshes with gears 8 which control register wheel means of a totalizer for performing computing operations. Another set of rack bars 9 is connected to the set of slide elements 3, and controls gear means acting on a storage register. This apparatus is, of course, well known, and not an object of the present invention.

Each of the differential slide elements 3 is connected by a portion 11 to a link 12 which acts on a pivoted lever 13. Each pivoted lever 13 is articulated to a bar 14 which is linked to a control bar 15. Each control bar 15 has a rack portion 15a at its end.

Since the differential slide elements 3 assume positions corresponding to the digits in their respective order, the control bars 15 assume corresponding shifted positions when the slide elements 3 represent a number. Each bar 14 is supported at longitudinally spaced points by brackets 14a.

Figures 3, 4:
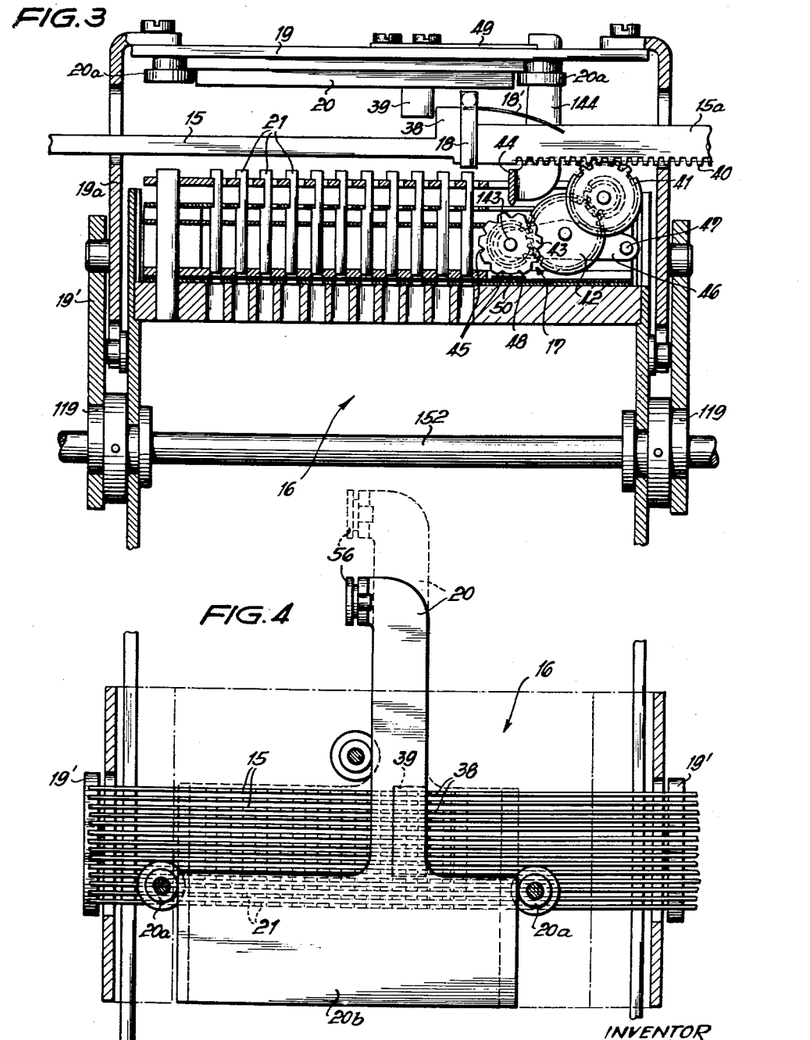
FIGURE 3 is a cross sectional view illustrating the punching device, and the printing device, the printing device being a modification of the printing device shown in FIGURE 2.
FIGURE 4 is a fragmentary plan view illustrating the means by the punching device is operated.

As best seen in FIGURE 3, each control bar 15 carries a coupling member 18 which is spring loaded by a spring 18′ to assume a raised position.

A row of punches 21 is arranged underneath each control bar 15 so that a row of punches is provided for each decimal order. FIGURE 3 shows a control bar 15 in its normal inoperative position, which may correspond to the digit zero. When the corresponding elements 3 are shifted in the accounting machine, lever 13 pulls bar 14 to the left as viewed in FIGURES 1 and 3, and consequently the coupling member 18 of each order is shifted to a position located above another punch 21 of the respective row of punches.

Operating means are provided which include a briging portion 19 extending across the control bars 15, and a slide member 20 which is guided on rollers 20a for movement in a transverse direction with respect to the control bars 15.

As best seen in FIGURE 4, slide member 20 has a narrower portion provided with a stop 39, and a wider portion 20b which is of such width in longitudinal direction of the control bars 15 that all coupling members 18 are located underneath portion 20b in all shifted positions of the control bars 15.

As explained above, the control bars 15 are respectively associated with decimal orders, and the lower decimal orders are located forwardly as viewed in FIGURE 4. Consequently, by shifting slide member 20, 20b, the portion 20b, will be located above a different number of control bars 15, starting with the control bars 15 associated with the lower orders. The control bars 15 associated with the higher order will be located underneath the narrower portion of the slide member 20, and since slide member 20 is provided with a stop 39 cooperating with stop shoulders 38 on the control bars 15, a selected number of control bars 15 associated with higher decimal orders will be accurately held in normal inoperative position corresponding to zero. As is clearly shown in FIGURE 4, the stop 39 does not extend into the wider portion 20b of slide member 20, and consequently the control bars 15 associated with a selected number of lower orders can move to the left as viewed in FIGURES 3 and 4 so that the coupling members 18 are located opposite a punch 21 whose position corresponds to a digit introduced, or computed in the accounting machine and represented by the position of the respective slide element 3.

Figure 5:
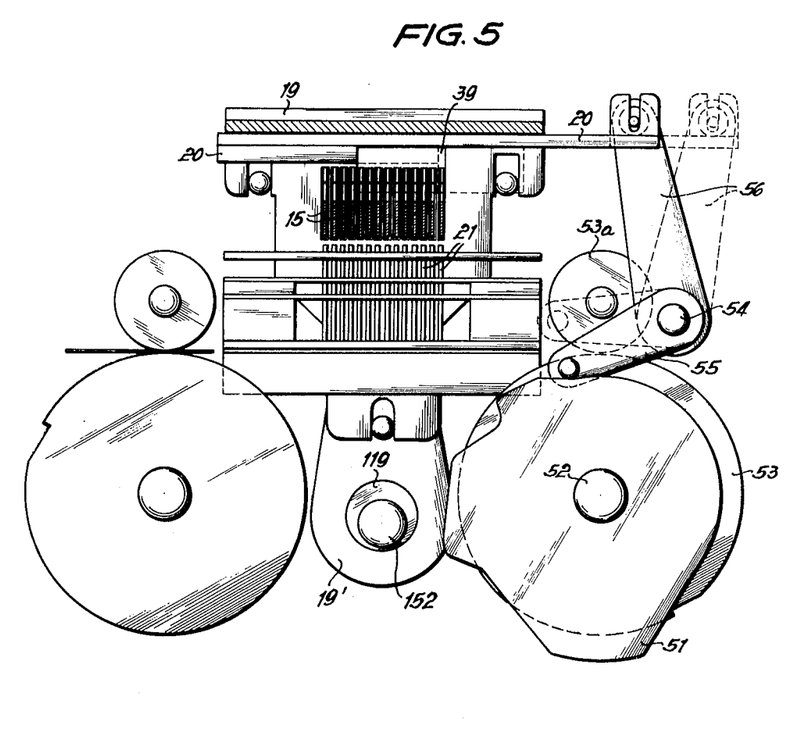
FIGURE 5 is a fragmentary rear view ilustrating an arrangement by which the number of punched decimal orders is determined in accordance with the column position of the record card.

As best seen in FIGURE 5, transporting rollers 53 and 53a are provided for feeding a record card underneath the punches 21. Each control bar 15 has a rack extension 15a which meshes with a gear 41 connected by a gear 42 to a gear attached to a printing roller means 43. Each printing roller means is associated with one decimal order, and is turned by the rack 15a of the control bar 15 associated with the same decimal order.

Each printing roller means has a plurality of printing faces provided with types for printing the different digits. An ink ribbon 48 is located underneath the printing means 43, and above the record card, so that lowering of the set of printing means 43 will result in an imprint on the record card. However, each printing roller 43 has a recessed face 50 which is located opposite the ribbon 48 and the card in one position of the printing means which corresponds to the normal inoperative position of the respective control bar 15. Consequently, control bars 15 associated with undesired higher decimal orders, and held in inoperative position by stop member 39, will hold the respective associated printing means 43 in a position in which no imprint is made on the card due to the recessed face 50.

The set of turnable printing means 43 is mounted on a shaft 143 which is supported on a pair of levers 46 whose fulcrum is a shaft 47 mounted on the frame of the machine. The set of printing means 43 is normally in a raised position and can be depressed into a printing position by a coupling bar 44.

Coupling bar 44 is supported on members 144 which are secured to spring means 49 on the bridging member 19 of the operating means.

The printing faces of each printing means 43 are separated by substantially wedge-shaped recesses which are substantially aligned in axial direction.

When the bridging member 19 is lowered by means which will be described hereinafter in greater detail, the coupling bar 44 is also lowered and engages a series of axially aligned recesses 45 so that all printing faces of the set of printing means 43 are exactly aligned. Thereupon further downward movement of the coupling bar 44 will move the set of printing means 43 to a printing position engaging the ribbon 48 for making an imprint on the record card. The pivoted levers 46 permit such movement of the set of printing means 43.

If the downward movement of bridging member 19 slightly exceeds the distance between the respective printing faces of the printing means 43 from the ribbon 48, springs 49 resiliently give a little.

It will be understood that each printing roller means 43 is turnable between a plurality of preset positions in which printing faces associated with different digits are located opposite the ribbon 48 and the card. If, for example, the control bar 15, 15a assumes a shifted position associated with the digit 5 in the respective order, the printing means 43 in the respective order will be turned through gears 41, 42 and an attached gear, not shown, into a position in which the printing face carrying the type for the digit 5 is located opposite the ribbon 48 so that upon movement of the coupling member 44 in downward direction, the respective digit 5 is printed on the record card.

As explained above, the control bars 15 are moved to shifted position representing digits under control of slide elements 3, resulting in presetting of the printing means to corresponding positions, and of placement of the coupling members 18 in corresponding positions over the respective punches 21.

The ends of bridging member 19 are provided with leg portions 19a which are turnably connected to a pair of levers 19'. Each lever 19' is mounted on a eccentric member 119 which is supported on a shaft 152. As best seen in FIG. 1b, shaft 152 carries a clutch 152a which includes a disc 170 fixed on shaft 152 and pivotally supporting a spring-loaded coupling pawl 171 which tends to fall into a notch on a disc 172. Disc 172 is fixed on a sleeve 173 rotatably mounted on shaft 152 and carrying a fixed gear 174 which meshes with a gear 152b on the shaft of motor 152c. When coupling pawl 171 is in coupling position, motor 152c drives shaft 152 through gears 152b, 174 and clutch 152a whose disc 170 is fast on shaft 152.

When shaft 152 is rotated, levers 19' will move bridging member 19 with slide 20 in downward direction so that the portion 20b of slide 20 will engage opposite coupling members 18 and depress the same into a position in which they actuate the respective punches 21 for punching holes in the record card. At the same time, lowering of bridging member 19 will result in lowering of coupling bar 44 which will move the entire set of printing means 43 to printing position for printing on the record card.

Evidently, this simultaneous marking operation on the record card must be performed at a predetermined moment of the cycle of operations, and after the control bars 15 were shifted to properly set the coupling members 18 and the printing means 43.

The carriage 2 of the accounting machine has in addition to its standard control bridge 22, another control bridge 23 on which stop tabs 24 can be set in selected positions along the length of the carriage so as to be associated with selected column positions of an account card located on the platen of the paper carriage 2. The tabs on the control bridge constitute program control means and can be set in accordance with a selected program.

As shown in FIGURE 1, tabs 24 on control bridge 23 cooperate with a pull rod 30 which is raised upon engagement with a tab 24, and raises a lever 31 which carries a coupling lever 32.

The main control cam shaft 33 of the accounting machine carries a control cam 34 which acts on an angular lever 35 which is connected to a push rod 36 so that during each revolution of cam 34, the push rod 36 performs a short stroke to the rear of the machine, which is to the right as viewed in FIGURE 1. If lever 32 has been raised by a tab 24 acting on a rod 30, push rod 36 will engage coupling lever 32 and pivot the same in clockwise direction whereby a link 37 is raised. If lever 31 is in its normal lower position in which lever 32 is out of the path of push rod 36, link 37 will not be raised.

Link 37 is connected in a conventional manner, not shown, to coupling pawl 171 of clutch 152a to hold the same in an inoperative position. When link 37 is raised, coupling pawl 171 is released to couple discs 170, 172 for one revolution after which pawl 171 is again rendered inoperative by link 37 which has returned in the meantime to its lower normal position.

Consequently, in the event that a tab 24 has placed coupling 32 in coupling position, movement of the push rod 36 on the control of cam 34 will result in turning of shaft 152 by motor 152c so that the operating means 19, 20 is lowered to effect punching and printing as described above. The number of orders punched in the record card is determined by the position of the slide 20, and more particularly by the position of portion 20b of slide 20, since only coupling members 18 located underneath portion 20b are actuated when the operating means 19, 20 are lowered.

It is desirable that only a selected number of orders are punched in the record card, the number of required orders depending on the subject matter which is to be entered in the respective column. Since the marking positions of the record card depend on the position of the transporting roller means 53 and 53a, the position of the slide member 20 must be related to the position of the transporting rollers 53, 53a.

Shaft 52, which carries the transporting drive roller 53, also carries a cam 51 which has spaced projecting cam track portions. A cam follower lever 55 slides along the track of cam 51, and operates another lever 56 through a shaft portion 54. Lever 56 is articulated to slide member 20, as best seen in FIGURE 5. When cam follower lever 55 engages a dwell of cam 51, lever 56 will turn in clockwise direction as viewed in FIGURE 5, and pull slide member 20 to a position in which portion 20b is located above a greater number of control bars 15. In FIGURE 5, the control bars 15 on the left are associated with the lower decimal orders so that a desired number of orders can be determined by the shape of cam 51. As explained above, the control bars 15 associated with higher orders are held by the stop projection 39 of slide member 20 in an inoperative position, whereas the control bars 15 underneath the slide member portion 20b are free to move to shifted positions representing different digits in the respective associated orders.

Figure 6:
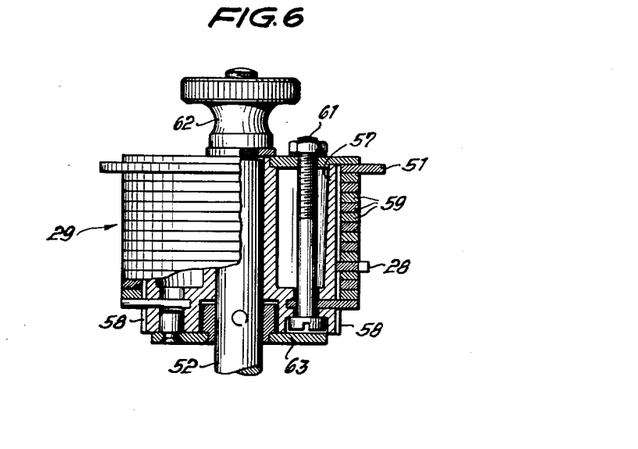
FIGURE 6 is a side view, partly in axial section, of a transport control means by which the transporting means can be set to stop with the record card in selected positions, the section in FIGURE 6 being taken on line 6—6 in FIGURE 7.
Figure 7:
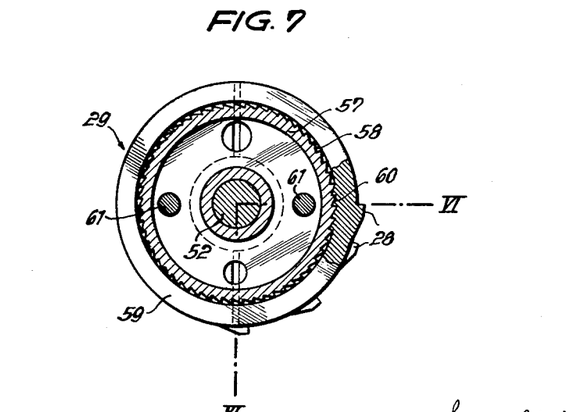
FIGURE 7 is a cross sectional view of the transport control device shown in FIGURE 6.
Figure 8:
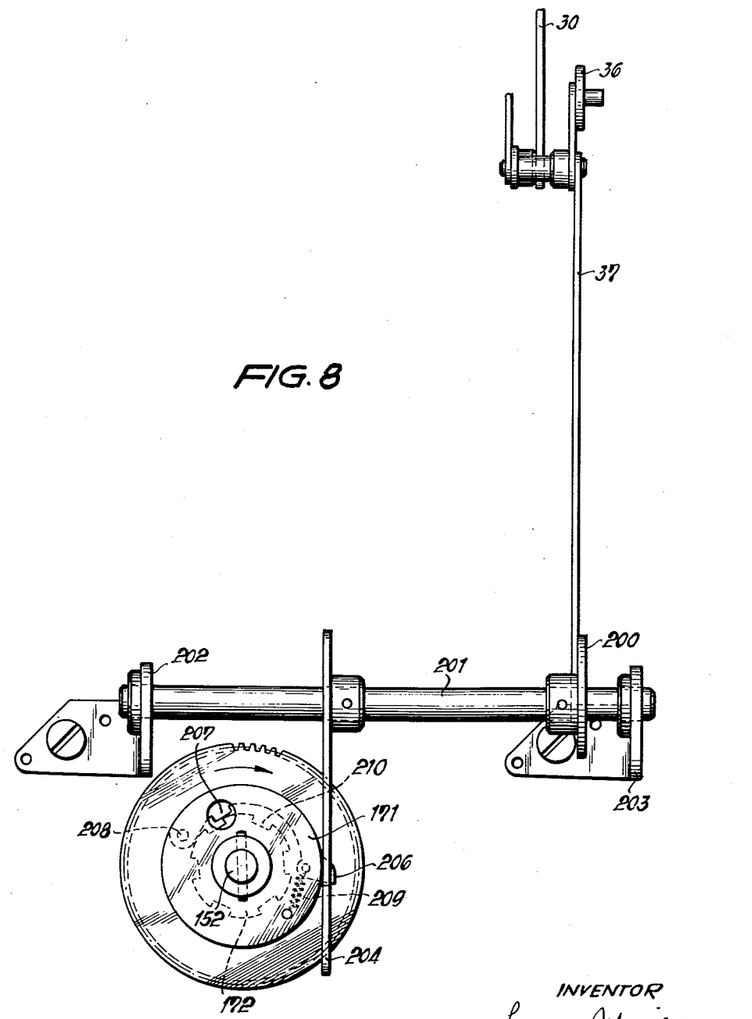
FIG. 8 is an end view on an enlarged scale illustrating a one-revolution clutch forming part of the apparatus shown in FIG. 1b.

Cam 51 is mounted on a transport control device which is secured to shaft 52, as best seen in FIGURES 6 and 7.

This transport control device 29 serves the purpose of stopping the transporting roller 53 together with shaft 52 on which transporting roller 53 is mounted. Such stopping is required when a card transported by the transporting rollers 53, 53a has arrived in a marking position in which a column is located opposite punching means 21. Of course, in this position, the printing means 43 are also located opposite a portion of the record card. It may be necessary to stop a single card several times for punching the card in several marking positions.

The transport control device 29 includes a member 63 which is fixed on shaft 52, and has pins 64 engaging corresponding holes in an inner member 57 whose outer cylindrical periphery has axially extending teeth 58. A plurality of stop rings 59, each provided with a stop projection 28, are mounted on the inner member 57 by means of inner teeth 60 engaging the outer teeth 58 of the inner member 57. Therefore, it is possible to attach the stop rings 59 to the inner member in different positions in which the stops 28 are angularly displaced, as desired, and are spaced from each other selected distances in peripheral direction. Bolt and nut means 61 and a disc, clamp the stop rings 59 and also cam 51 together. Cam 51 has inner teeth engaging the outer teeth 58 of the inner drum member 57.

The entire transport control device 29 can be removed from shaft 52 when the nut 62 is unscrewed, so that the relative positions of elements 59 may be changed. When member 29 is again assembled by means of bolts 61, it can be put back onto shaft 52 and is coupled to the same for turning movement by means of the coupling pins 64 projecting in corresponding holes in the inner member 57. Shaft 52 with transport control device 29 and cam 51 is driven by motor 152c through gears 152b, 174, sleeve 173 and a friction clutch 160 mounted on sleeve 173. As shown in FIG. 1b, friction clutch 160 includes spring means 161, an end member 162 fixed on sleeve 173, a pair of felt discs 164 urged toward each other by a disc 163 and a gear 165 having flanges frictionally engaging discs 164. Gear 165 meshes with a gear fixed on transport control device 29 and connected to shaft 52 for rotation.

A series of tabs is provided on the control bridge 23 which are placed to effect stopping of the transporting means when marking of the card is desired. As best seen in FIGURES 1 and 2, a set of levers 25 cooperates with the tabs 24, each lever being connected by a linkage 26 to stop levers 27 which are axially spaced the same distance as the stop ring members 59 with their stops 28. Engagement of a tab 24 with a lever 25 effects shifting of the entire linkage 26, and shifting of the respective stop lever, or stop levers, 27 to an advanced position in which their ends are located in the circular path of an associated stop 28. Consequently transport control means 29, cam 51, and transporting roller 53 are stopped as long as a tab 24 engages a lever 25. While shaft 52 is stopped by the blocked transport control device 29, friction clutch 160 slips and shaft 52 continues to rotate and actuates the punching and printing means through eccentrics 119, and operating means 18, 19', 19a, 19, 20 and 44.

Stopping of the transporting roller 53 results in stopping of the card in a marking position in which the punches 21 and the printing means 43 are located opposite desired column positions. Since cam 51 is also mounted on shaft 52, it is also stopped, and slide member 20 is held in a position in which a number of decimal orders desired in such column is punched.

The number of stops 28 on the transport control means 29 corresponds to the number of marking positions of the record card. The number of teeth 58 is increased by a certain number of bridging teeth which correspond to the distance between two successive cards fed by the transporting rollers 53, 53a.

The above described apparatus operates in the following manner:

The digits of a number to be computed and posted in the accounting machine are introduced into the pin carriage 4 by operation of the keys of the accounting machine. The differential slides 3 transfer the values to the printing device 6 and into the totalizers 8 and 10. Printing device 6 prints the numbers in corresponding columns of an account sheet mounted on the paper carriage 2.

As the differential slide elements 3 are shifted in accordance with the represented digits in their respective orders, the control means 15, 15a, 18 are shifted to the left as viewed in FIGURES 1, 3 and 4, and assume shifted positions respectively associated with the introduced digits. The coupling member 18 of each control bar 15 is thereby placed in a position located opposite a punch 21 which is positioned to punch a hole in the card in a position associated with the respective digit.

At the same time, the printing means 43 are turned into a position in which the printing faces associated with the respective digits in the respective orders are located opposite the ribbon 50 and the record card.

A tab 24 on the paper carriage 2 shifted through rod 30 the coupling lever 32 into its operative position in which it is engaged by the push rod 36 under the control of cam 34 which turns in timed relation with the cycle of the machine. Consequently, rod 37 is raised and actuates the clutch 152a by which shaft 152 is coupled to the drive means 152c of the machine so that operating means 19, 20 are lowered by members 119 and 19' to move to an actuated position in which the wider portion 20a of the slide 20 engages opposite coupling members 18 so that associated punches 21 are moved to punching position perforating the card.

At the same time, coupling bar 44 is lowered together with bridging member 19 of the operating means, and engages a series of aligned recesses 45 of the printing means 43 which are already preset. The recesses 45 are first exactly aligned so that the printing faces located opposite the ribbon 50 are also exactly aligned, whereupon further movement of bridging member 19 with coupling member 44 moves the set of printing means 43 downwardly to a printing position in which the respective operative printing faces engage the ribbon 50 and produce an imprint on the record card thereunder. When the eccentric members 119 turn to a position in which the bridging member 19 and slide member 20 are again raised, springs 18' retract the coupling members 18, and a spring, not shown, retracts lever 46 on which the shaft 143 of the set of printing means 43 is mounted.

At the same time the card is transported by the transporting rollers 53, 53a to its next marking position which is determined by engagement of a stop 28 with a stop lever 27 which was placed in advanced operative position through the respective linkage 26 under control of a tab 24 on the carriage 2.

The position of the tabs 24 in the control bridge 23 with respect to the carriage 2 determines which stop lever system 25, 26, 27 is shifted to actuated position to become operative by engaging a stop 28 on the transport control means 29 so that shaft 52 is stopped.

The transporting rollers 53, 53a are stopped in this manner, and cam 51, which is also mounted on shaft 52 and secured to the stop rings 57, is also stopped in a position associated with the respective column which is to be marked on the card. A selected projecting cam portion of cam 51 engages the cam follower lever 55 in each stopped position of the cam 51, so that the slide member 20 is shifted by levers 55, 56 into a position associated with the respective column. The position of the slide member determines the number of orders punched in the card, so that in each column of the card, a previously selected number of orders is punched.

The control bars, whose coupling members 18 are not actuated by the portion 20b of slide member 20, are held by stop member 39 in an inoperative position in which the printing means 43 are turned into the position illustrated in FIGURE 3 in which the depressed face 50 is located opposite the ribbon 48, so that depression of the entire set of printing means 43 will not produce any imprints of the printing means 43 of the higher orders whose control bars 15 are held in inoperative position by stop member 39, as best seen in FIGURE 4.

It will be understood that each of the elements described above, or two or more together, may also find a useful application in other types of accounting machines differing from the types described above.

While the invention has been illustrated and described as embodied in an accounting machine with a combined punching and printing device for record cards by which all entries of the accounting machine are marked on the record card, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an accounting machine, in combination, transporting means for transporting a card between marking positions; a set of punching means, respectively associated with denominational orders, each punching means including a row of punches respectively associated with a series of characters, each of said punches being movable to a punching position for punching the card; a set of control bars respectively associated with said rows of punches, each control bar being longitudinally movable in direction of the associated row of punches between a plurality of shifted positions respectively associated with said series of characters; a spring-loaded coupling member mounted on each of said control bars for movement in transverse direction to an actuated position, each coupling member being located opposite a different punch of the row of punches associated with the respective control bar in said shifted positions of said control bars, and engaging the respective punch in the actuated position thereof; operating means including a bridging member extending across said control bars, and a slide member mounted on said bridging member for movement across said control bars and said coupling members, said slide member being movable between a plurality of order number determining positions located opposite different numbers of said coupling members starting from the lowermost denominational orders, said operating means being movable to an operative position for actuating the coupling members located opposite said slide member to move to said actuated positions for moving selected punches to said punching position whereby holes are punched in said card representing characters selected by shifting said control bars.

2. In an accounting machine, in combination, transporting means for transporting a card between marking positions; a set of punching means, respectively associated with denominational orders, each punching means including a row of punches respectively associated with a series of characters, each of said punches being movable to a punching position for punching the card; a set of printing means respectively associated with denominational orders, each printing means having a plurality of printing faces respectively associated with a series of characters, and being turnable between a plurality of preset positions respectively associated with said characters in which the respective printing faces are located opposite said card, said set of printing means being movable to a printing position for printing on the card the characters associated with the respective preset position of each printing means, each printing means having guide recesses between adjacent printing faces; a set of control bars respectively associated with said rows of punches and with said printing means, each control bar being longitudinally movable in direction of the associated row of punches between a plurality of shifted positions respectively associated with said series of characters, each of said control bars having a rack bar portion; gear means meshing with each rack bar portion and being connected to the respective associated printing means for turning the same between said preset positions when the respective control bar moves between said shifted positions thereof; a spring-loaded coupling member mounted on each of said control bars for movement in transverse direction to an actuated position, each coupling member being located opposite a different punch of the row of punches associated with the respective control bar in said shifted positions of said control bars, and engaging the respective punch in the actuated position thereof; a coupling bar located intermediate said control bars and said set of printing means and extending across said control bars and in axial direction of said printing means opposite a set of said guide recesses, said coupling bar being movable in transverse direction to a position located in said set of guide recesses for aligning said set of guide recesses and said printing faces and being further movable in said transverse direction for moving said set of printing means to said printing position; operating means including a bridging member extending across said control bars, and a slide member mounted on said bridging member for movement across said control bars and said coupling members, said slide member being movable between a plurality of order number determining positions located opposite different numbers of said coupling members starting from the lowermost denominational orders, said operating means being movable to an operative position for actuating the coupling members located opposite said slide member to move to said actuated positions for moving selected punches to said punching position, said operating means engaging said coupling bar in said operative position for moving the same in said transverse direction into said guide recesses for moving said set of printing means to said printing position whereby holes are punched in said card representing characters selected by shifting said control bars while the same selected characters are printed on said card.

3. A machine as set forth in claim 2 wherein each of said printing means has a recessed face in addition to said printing faces; wherein said slide member includes a projecting stop engaging coupling members associated with control bars which are not shifted and are in a normal inoperative position, each of said control bars in said normal inoperative position holding the associated printing means in a position in which said recessed face is adapted to be located opposite the card so that no imprint is made when said set of printing means is moved to said printing position.

4. In an accounting machine, in combination, transporting means for transporting a card between marking positions; a set of punching means, respectively associated with denominational orders, each punching means including a row of punches respectively associated with a series of characters, each of said punches being movable to a punching position for punching the card; a set of control bars respectively associated with said rows of punches, each control bar being longitudinally movable in direction of the associated row of punches between a plurality of shifted positions respectively associated with said series of characters; a coupling member mounted on each of said control bars for movement in transverse direction to an actuated position, each coupling member being located opposite a different punch of the row of punches associated with the respective control bar in said shifted positions of said control bars, and engaging the respective punch in the actuated position thereof; and operating means movable to an operative position for actuating said set of coupling members to move to said actuated positions for moving selected punches to said punching position; rotary drive means; shifting means connected to said operating means and including a turnable eccentric member turnable to a position effecting movement of said operating means to said operative position; a clutch for connecting said drive means to said turnable eccentric member; a driven cam means; a linkage including a cam follower cooperating with said cam means and being connected to said clutch for moving the same to coupling position in a predetermined position of said cam means associated with the operation of said accounting machine, said linkage including a shiftable coupling normally in a disconnected position; a plurality of tabs adapted to be mounted on the carriage of the accounting machine; and linking means connected to said shiftable coupling and being operated by said tabs in predetermined positions of said carriage to shift said shiftable coupling to a coupling position in which said linkage connects said cam means with said clutch so that when the carriage arrives in predetermined positions associated with said tabs, said operating means are moved to operative position for effecting punching.

5. In an accounting machine, in combination, transporting means for transporting a card between marking positions; a set of punching means, respectively associated with denominational orders, each punching means including a row of punches respectively associated with a series of characters, each of said punches being movable to a punching position for punching the card; a set of control bars respectively associated with said rows of punches, each control bar being longitudinally movable in direction of the associated row of punches between a plurality of shifted positions respectively associated with said series of characters; a spring-loaded coupling member mounted on each of said control bars for movement in transverse direction to an actuated position, each coupling member being located opposite a different punch of the row of punches associated with the respective control bar in said shifted position of said control bars, and engaging the respective punch in the actuated position thereof; operating means including a bridging member extending across said control bars, and a slide member mounted on said bridging member for movement across said control bars and said coupling members, said slide member being movable between a plurality of order number determining positions located opposite different numbers of said coupling members starting from the lowermost denominational orders, said operating means being movable to an operative position for actuating the coupling members located opposite said slide member to move to said actuated positions for moving selected punches to said punching position whereby holes are punched in said card representing characters selected by shifting said control bars; a turnable cam connected to said transporting means for turning movement in timed relation with the same; and connecting means including a cam follower cooperating with said cam and being connected to said slide member for moving the same between said positions so that when said transporting means stop with said card in a marking position, said slide member is in a selected position for effecting punching of a selected number of denominational orders.

6. In an accounting machine, in combination, transporting means for transporting a card between marking positions; a set of punching means, respectively associated with denominational orders, each punching means including a row of punches respectively associated with a series of characters, each of said punches being movable to a punching position for punching the card; a set of printing means respectively associated with denominational orders, each printing means having a plurality of printing faces respectively associated with a series of characters, and being turnable between a plurality of preset positions respectively associated with said characters in which the respective printing faces are located opposite said card, said set of printing means being movable to a printing position for printing on the card the characters associated with the respective preset position of each printing means, each printing means having guide recesses between adjacent printing faces; a set of control bars respectively associated with said rows of punches and with said printing means, each control bar being longitudinally movable in direction of the associated row of punches between a plurality of shifted positions respectively associated with said series of characters, each of said control bars having a rack bar portion; gear means meshing with each rack bar portion and being connected to the respective associated printing means for turning the same between said preset positions when the respective control bar moves between said shifted positions thereof; a spring-loaded coupling member mounted on each of said control bars for movement in transverse direction to an actuated position, each coupling member being located opposite a different punch of the row of punches associated with the respective control bar in said shifted positions of said control bars, and engaging the respective punch in the actuated position thereof; a coupling bar located intermediate said control bars and said set of printing means and extending across said control bars and in axial direction of said printing means opposite a set of said guide recesses, said coupling bar being movable in transverse direction to a position located in said set of guide recesses for aligning said set of guide recesses and said printing faces and being further movable in said transverse direction for moving said set of printing means to said printing position; operating means including a bridging member extending across said control bars, and a slide member mounted on said bridging member for movement across said control bars and said coupling members, said slide member being movable between a plurality of order number determining positions located opposite different numbers of said coupling members starting from the lowermost denominational orders, said operating means being movable to an operative position for actuating the coupling members located opposite said slide member to move to said actuated positions for moving selected punches to said punching position, said operating means engaging said coupling bar in said operative position for moving the same in said transverse direction into said set of guide recesses for moving said set of printing means to said printing position whereby holes are punched in said card representing characters selected by shifting said control bars while the same selected characters are printed on said card; a turnable cam connected to said transporting means for turning movement in timed relation with the same; and connecting means including a cam follower cooperating with said cam and being connected to said slide member for moving the same between said positions so that when said transporting means stop with said card in a marking position, said slide member is in a selected position for effecting punching and printing of a selected number of denominational orders.

7. A machine as set forth in claim 6, and including rotary drive means; shifting means connected to said operating means and including a turnable eccentric member turnable to a position effecting movement of said operating means to said operative position; a clutch for connecting said drive means to said turnable eccentric member; a cam means driven from said drive means; a linkage including a cam follower cooperating with said cam means and being connected to said clutch for moving the same to coupling position in a predetermined position of said cam means associated with the operation of said accounting machine, said linkage including a shiftable coupling normally in a disconnected position; a plurality of tabs adapted to be mounted on the carriage of the accounting machine; and linking means connected to said shiftable coupling and being operated by said tabs in predetermined positions of said carriage to shift said shiftable coupling to a coupling position in which said linkage connects said cam means with said clutch so that when the carriage arrives in predetermined positions associated with said tabs, said operating means are moved to operative position for effecting punching and printing.

8. In an accounting machine, in combination, transporting means including transporting rollers for transporting a card; transport control means connected to one of said transporting rollers for turning movement therewith, said transport control means including a plurality of axially spaced stop members spaced in peripheral direction from each other and associated with different marking positions of a transported card; stop tab means adapted to be mounted on the carriage of the accounting machine; a plurality of stop linkages located in the paths of said stop tab means so as to be shifted by the same into operative positions, each stop linkage being associated with one of said stop members and located in the path of the same for stopping said transport control means in said operative position of the respective stop linkage so that said transporting means are stopped in selected carriage positions to hold said card in marking positions; a set of punching means, respectively associated with denominational orders, each punching means including a row of punches respectively associated with a series of characters, each of said punches being movable to a punching position for punching the card; a set of control bars respectively associated with said rows of punches, each control bar being longitudinally movable in direction of the associated row of punches between a plurality of shifted positions respectively associated with said series of characters; a coupling member mounted on each of said control bars for movement in transverse direction to an actuated position, each coupling member being located opposite a different punch of the row of punches associated with the respective control bar in said shifted positions of said control bars, and engaging the respective punch in the actuated position thereof; and operating means movable to an operative position for actuating said set of coupling members to move to said actuated positions for moving selected punches to said punching position whereby holes are punched in said card representing characters selected by shifting said control bars.

9. In an accounting machine, in combination, transporting means including transporting rollers for transporting a card; transport control means connected to one of said transporting rollers for turning movement therewith, said transport control means including a plurality of axially spaced stop members spaced in peripheral direction from each other and associated with different marking positions of a transported card; stop tab means adapted to be mounted on the carriage of the accounting machine; a plurality of stop linkages located in the paths of said stop tab means so as to be shifted by the same into operative positions, each stop linkage being associated with one of said stop members and located in the path of the same for stopping said transport control means in said operative position of the respective stop linkage so that said transporting means are stopped in selected carriage positions to hold said card in marking positions; a set of printing means respectively associated with denominational orders, each printing means having a plurality of printing faces respectively associated with a series of characters, and being turnable between a plurality of preset positions respectively associated with said characters in which the respective printing faces are located opposite said card, said set of printing means being movable to a printing position for printing on the card the characters associated with the respective preset position of each printing means; a set of control bars respectively associated with said rows of punches and with said printing means, each control bar being longitudinally movable in direction of the associated row of punches between a plurality of shifted positions respectively associated with said series of characters, each of said control bars having a rack bar portion; gear means meshing with each rack bar portion and being connected to the respective associated printing means for turning the same between said preset positions when the respective control bar moves between said shifted positions thereof; a coupling bar located intermediate said control bars and said set of printing means and extending across said control bars and in axial direction of said printing means opposite a set of said guide recesses, said coupling bar being movable in transverse direction for moving said set of printing means to said printing position; operating means including a bridging member extending across said control bars, and a slide member mounted on said bridging member for movement across said control bars and said coupling members, said slide member being movable between a plurality of order number determining positions located opposite different numbers of said coupling members starting from the lowermost denominational orders, said operating means being movable to an operative position engaging said coupling bar in said operative position for moving the same in said transverse direction for moving said set of printing means to said printing position whereby characters selected by shifting said control bars are printed on said card.

10. A machine as set forth in claim 8 wherein said transport control means includes an inner gear member, and wherein said stop members are rings having inner teeth engaging said inner gear member and having stop projections on the periphery thereof cooperating with said stop linkages, said gear member being adapted to be driven from the drive means of the machine.

11. In an accounting machine, in combination, transporting means including transporting rollers for transporting a card; transport control means connected to one of said transporting rollers for turning movement therewith, said transport control means including a plurality of axially spaced stop members spaced in peripheral direction from each other and associated with different marking positions of a transported card; stop tab means adapted to be mounted on the carriage of the accounting machine; and a plurality of stop linkages located in the paths of said stop tab means so as to be shifted by the same into operative positions, each stop linkage being associated with one of said stop members and located in the path of the same for stopping said transport control means in said operative position of the respective stop linkage so that said transporting means are stopped in selected carriage positions to hold said card in marking positions.

12. In an accounting machine, in combination, transporting means including transporting rollers for transporting a card; transport control means connected to one of said transporting rollers for turning movement therewith, said transport control means including an inner member having outer teeth and a plurality of axially spaced stop rings having inner teeth engaging said outer teeth to be coupled to said inner member in a plurality of selectable turned positions, said stop rings having stop projections on the outer periphery thereof associated with different marking positions of a transported card; stop tab means adapted to be mounted on the carriage of the accounting machine; and a plurality of stop linkages located in the paths of said stop tab means so as to be shifted by the same into operative positions, each stop linkage being associated with one of said stop rings and located in the path of movement of the respective stop projection for stopping said transport control means in said operative position of the respective stop linkage so that said transporting means are stopped in selected carriage positions to hold said card in marking positions.

13. In an accounting machine, in combination, transporting means including transporting rollers for transporting a card; transport control means connected to one of said transporting rollers for turning movement therewith, said transport control means including a plurality of stop members spaced in peripheral direction from each other and associated with different marking positions of a transported card; stop tab means adapted to be mounted on the carriage of the accounting machine; and a plurality of stop linkages located in the paths of said stop tab means so as to be shifted by the same into operative positions, each stop linkage being associated with one of said stop members and located in the path of the same for stopping said transport control means in said operative position of the respective stop linkage so that said transporting means are stopped in selected carriage positions to hold said card in marking positions.

14. In an accounting machine, in combination, transporting means including transporting rollers for transporting a card; transport control means connected to one of said transporting rollers for turning movement therewith, said transport control means including a plurality of stop members spaced in peripheral direction from each other and associated with different marking positions of a transported card; detachable stop tab means adapted to be mounted on the carriage of the accounting machine and a plurality of stop linkages located in the paths of said stop tab means so as to be shifted by the same into operative positions when the carriage arrives in selected positions, each stop linkage being associated with one of said stop members and located in the path of the same for stopping said transport control means in said operative position of the respective stop linkage so that said transporting means are stopped in selected carriage positions to hold said card in marking positions.

15. In an accounting machine, in combination, transporting means including transporting rollers for transporting a card; transport control means connected to one of said transporting rollers for turning movement therewith, said transport control means including a plurality of stop members spaced in peripheral direction from each other and associated with different marking positions of a transported card; detachable stop tab means adapted to be mounted on the carriage of the accounting machine; a plurality of stop linkages located in the paths of said stop tab means so as to be shifted by the same into operative positions when the carriage arrives in selected positions, each stop linkage being associated with one of said stop members and located in the path of the same for stopping said transport control means in said operative position of the respective stop linkage so that said transporting means are stopped in selected carriage positions to hold said card in marking positions; a set of punching means, respectively associated with denominational orders, each punching means including a row of punches respectively associated with a series of characters, each of said punches being movable to a punching position for punching the same; operating means for moving selected punches to said punching positions, and including a cam connected for turning movement to said transport control means, a cam follower cooperating with said cam, a slide member movable in transverse direction across said set of punching means, and actuating means for moving said slide member to an actuated position for moving selected punches to said punching position so that said punching means are only operated in selected orders in accordance with the position of said cam and depending on the position of said stop tab means on said carriage.

16. The combination set forth in claim 12 wherein the number of said outer teeth of said inner member is selected corresponding to the number of card positions in which punching takes place, and including teeth permitting a gap between said stop projections corresponding to the distance between two successively transported cards.

17. In an accounting machine, in combination, rotary transporting means for transporting cards; transport control means connected to said transporting means for synchronized movement therewith, said transport control means including a plurality of stop members spaced in direction of its movement from each other and associated with different marking positions of a transported card; a drive motor; means connecting said drive motor with said transport control means and including friction clutch means; first and second stop tab means adapted to be mounted on the carriage of the accounting machine; a plurality of stop linkages located in the paths of said first stop tab means so as to be shifted by the same into operative positions, each stop linkage being associated with one of said stop members and located in the path of the same for stopping said transport control means in said operative position of the respective stop linkage so that said transporting means is stopped in selected carriage positions to hold said card in marking positions; a set of marking means respectively associated with denominational orders, each marking means including a series of marking elements respectively associated with the characters or digits of a series, said marking means being movable to a marking position for marking a card when said transporting means is stopped by said transport control means when the same is stopped; operating means for moving said marking means to said marking position; means for connecting a selected number of said marking elements to said operating means for movement to said marking position; linkage means connecting said last mentioned means with said second stop tab means so that in accordance with the carriage position, a selected number of marking means is actuated by said operating means whereby the number of orders marked on the cards is determined in accordance with the marking position of the card; and means operatively connecting said operating means with said drive motor so that said operating means is operated in synchronism with said transporting means so that said marking means is moved to said marking position when said transporting means is stopped.

18. In an accounting machine, in combination, a movable carriage adapted to support forms to be printed; program control means moving in synchronism with said carriage for controlling the functions of the machine; transporting means for transporting record cards to be marked; and transport control means moving in synchronism with said transporting means; said program control means being operatively connected to said transport control means for controlling the movements of the same and of said transporting means.

19. In an accounting machine, in combination, a movable carriage adapted to support forms to be printed; program control means moving in synchronism with said bookkeeping carriage for controlling the functions of the machine, said program control means comprising tab means selectively arranged in columns and rows according to the desired program, and tab operated means actuated by said tab means; transporting means for transporting record cards to be marked; and transport control means moving in synchronism with said transporting means; said tab operated means cooperating with said transport control means for controlling the movements of the same and of said transporting means from said program control means.

20. In an accounting machine, in combination, a movable carriage adapted to support forms to be printed; program control means moving in synchronism with said bookkeeping carriage for controlling the functions of the machine; transporting means for transporting record cards to be punched; transport control means moving in synchronism with said transporting means and having a plurality of detachable, spaced stop members associated with different fields of said record card, said program control means being operatively connected to said transport control means to control movement of the same and thereby transport of said record card by said transporting means.

21. In an accounting machine, in combination, a bookkeeping carriage, printing means, said bookkeeping carriage being transversely movable relative to said printing means to receive imprints on forms inserted in said bookkeeping carriage; program control means moving in synchronism with said bookkeeping carriage for controlling the functions of the machine; said program control means comprising tab means selectively arranged in columns and rows according to the desired program, and tab operated means actuated by said tab means; transporting means for transporting record cards to be punched; rotary transport control means moving in synchronism with said transporting means, said transport control means having stop members spaced in axial and peripheral directions from each other and cooperating with said tab operated means to control movements of the same and thereby movement of said record card by said transporting means.

References Cited in the file of this patent

UNITED STATES PATENTS

| | | |
|---|---|---|
| 2,050,745 | Woodruff | Aug. 11, 1936 |
| 2,110,854 | Fuller et al. | Mar. 15, 1938 |
| 2,211,310 | Andrews | Aug. 13, 1940 |
| 2,240,667 | Paris | May 6, 1941 |
| 2,490,373 | Page et al. | Dec. 6, 1949 |